US007559098B2

(12) United States Patent
He

(10) Patent No.: US 7,559,098 B2
(45) Date of Patent: Jul. 14, 2009

(54) MOTION CONTROL APPARATUS FOR HOSPITAL BED

(75) Inventor: Tsai-Tien He, Minxiong Shiang (TW)

(73) Assignee: Sigma-Care Development Co., Ltd., Minxiong Shiang (TW)

( * ) Notice: Subject to any disclaimer, the term of this patent is extended or adjusted under 35 U.S.C. 154(b) by 76 days.

(21) Appl. No.: 11/782,977

(22) Filed: Jul. 25, 2007

(65) Prior Publication Data

US 2008/0047065 A1 Feb. 28, 2008

(30) Foreign Application Priority Data

Aug. 25, 2006 (TW) ............................. 95215059 U

(51) Int. Cl.
*A61G 7/08* (2006.01)
*B62B 5/04* (2006.01)

(52) U.S. Cl. ............................ 5/81.1 R; 5/600; 188/19

(58) Field of Classification Search ................ 5/86.1 R, 5/600, 620, 81.1 R; 188/1.12, 9, 10, 16, 188/19, 20, 21, 106 R, 116; 280/87.01, 33.994; 16/35

See application file for complete search history.

(56) References Cited

U.S. PATENT DOCUMENTS 1,882,746 A * 10/1932 Bendix ....................... 188/156
1,896,963 A * 2/1933 Leventis ..................... 188/3 R
6,264,006 B1 * 7/2001 Hanson et al. ............. 188/1.12
6,421,854 B1 * 7/2002 Heimbrock .................... 5/610
6,668,402 B2 * 12/2003 Heimbrock .................... 5/600
6,820,294 B2 * 11/2004 Shiery et al. ................... 5/611
7,062,805 B2 * 6/2006 Hopper et al. ................ 5/86.1
2003/0159215 A1 * 8/2003 Shiery et al. ................... 5/600
2003/0196268 A1 * 10/2003 Heimbrock .................... 5/601
2004/0181875 A1 * 9/2004 Shiery et al. ................... 5/600
2005/0057010 A1 * 3/2005 Hopper et al. ........... 280/47.16

* cited by examiner

*Primary Examiner*—Patricia L Engle
*Assistant Examiner*—Gilbert Y Lee
(74) *Attorney, Agent, or Firm*—Alan Kamrath; Kamrath & Associates PA

(57) ABSTRACT

A motion control apparatus for a hospital bed includes an axial shaft passing through two wheel modules. Three pedals capable of swinging upwardly and downwardly are pivotally disposed on the chassis in parallel. Driving components are fixedly disposed in opposite directions on the axial shaft corresponding to the pedals on two sides. A coupler is disposed between each driving component and pedal. When one of the two pedals on the two sides is stepped on downwardly, the axial shaft is driven to turn and results in braking of the wheel modules. When the middle pedal is stepped on downwardly, the other pedals gathered together swing downwardly at the same time, and the pedals on the two sides come to lean on the middle pedal at the same time and stop, resulting in disabling of the braking or orientation function.

4 Claims, 5 Drawing Sheets

MOTION CONTROL APPARATUS FOR HOSPITAL BED

BACKGROUND OF THE INVENTION

1. Field of the Invention

The present invention relates to pedals used for stepping downwardly thereon to control the braking and orientation of a hospital bed respectively, and a returning pedal disposed between the two pedals for disabling the functions of braking or orientation.

2. Description of the Related Art

The assignee of the present invention has a patent "Braking Apparatus for Hospital Bed" with Taiwanese Application No. 095204622 and Taiwanese Patent No. TW296695Y. The apparatus is mainly comprised of wheel modules that are free to change direction and are disposed at the four corners of the chassis of a movable hospital bed. Two axial shafts are respectively disposed between the two adjacent wheel modules at the front and the rear ends of the hospital bed. By turning the axial shaft in different directions and at various angles, the braking of the wheel module will be active or inactive, or at least one wheel module will be unable to change direction (i.e. of a fixed direction). The structure driving the axial shafts at the front and the rear ends comprise two pairs of swing shafts fixedly disposed respectively on the shafts. A linkage is pivotally connected between the ends of the swing shafts at the front and the rear ends. A control swing shaft is further fixedly disposed on the axial shaft at one of the two ends. An operation rack (i.e. the pedal for braking the wheel module or fixing the direction thereof) that can swing upwardly or downwardly is pivotally disposed on the chassis at the same end. A coupler is pivotally connected between the control swing shaft and the operation rack. The operation rack swings at various angles and positions upwardly and downwardly and drives the axial shafts to turn at various angles through the coupler and the control swing shaft. Not only is the braking and orientation of a hospital bed controlled, but, also, the swing angle of the operation rack is substantially reduced to conform to better ergonomics and easier operation for the user. The operation is more convenient, and dangerous situations such as slipping during operation occur less frequently.

However, in the prior art mentioned above or for general hospital beds, the operation rack (i.e. pedal) for braking and orientation swings downwardly to brake the hospital bed and upwardly to fix the orientation. That is, the operation rack can be used both for braking and orientation. Although the structure is simple, the following issues need to be improved.

First, a common user is used to operating an apparatus in a straightforward and easy way. The operation rack (i.e. pedal) for braking and orientation of a hospital bed does not adhere to such habits. When controlling the orientation of a hospital bed, the operation rack needs to be pulled upwardly. Such operation does not conform to good ergonomics and may cause dangerous reactions.

Second, the operation rack is disposed below the hospital bed. The design is for the convenience of operation by a user's foot. When the operation rack is stepped on downwardly, the hospital bed performs braking. When the operation rack is hooked upwardly, the hospital bed fixes the orientation thereof. However, when hooking the operation rack upwardly, the surface of the shoe is against the back of the operation rack, and the user raises his foot to make the operation rack swing upwardly. Although the operation is done, the surface of the shoe becomes worn, and the user wants to avoid this.

SUMMARY OF THE INVENTION

To improve upon mistakes that might occur during operation, difficulty of operation and so on, the technique of the present invention is to dispose an axial shaft through the front and rear wheel modules of the chassis to control the braking or orientation thereof. Three pedals are capable of swinging upwardly and downwardly and are pivotally disposed on the chassis in parallel. Pedals on two sides can drive the axial shaft in different directions respectively when swinging. The two sides of the middle pedal are set against the other two pedals.

Therefore, by the separate disposition of the pedals for braking and orientation of the hospital bed of the present invention, the operation conforms more to ergonomics and common habits. The operation of a user is simpler and easier. Moreover, it is only necessary to step on the middle pedal to brake or disable the orientation status, which simplifies the overall operation.

Other features and advantages of the present invention will become apparent in the following detailed description of the preferred embodiment with reference to the accompanying drawings.

DETAILED DESCRIPTION OF THE PREFERRED EMBODIMENT

Figure 1:
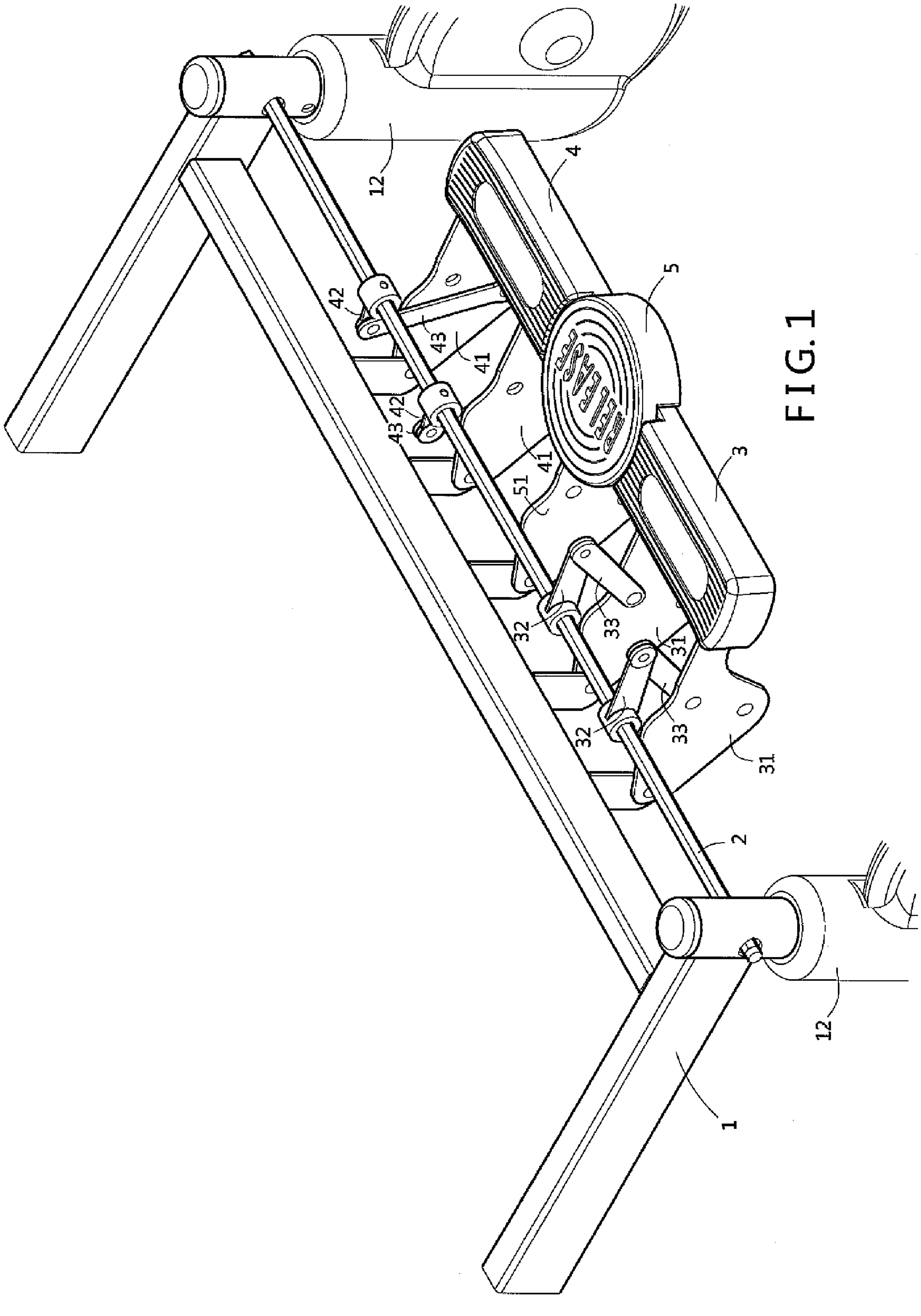
FIG. 1 is a perspective view showing a preferred embodiment of the present invention.
Figure 2:
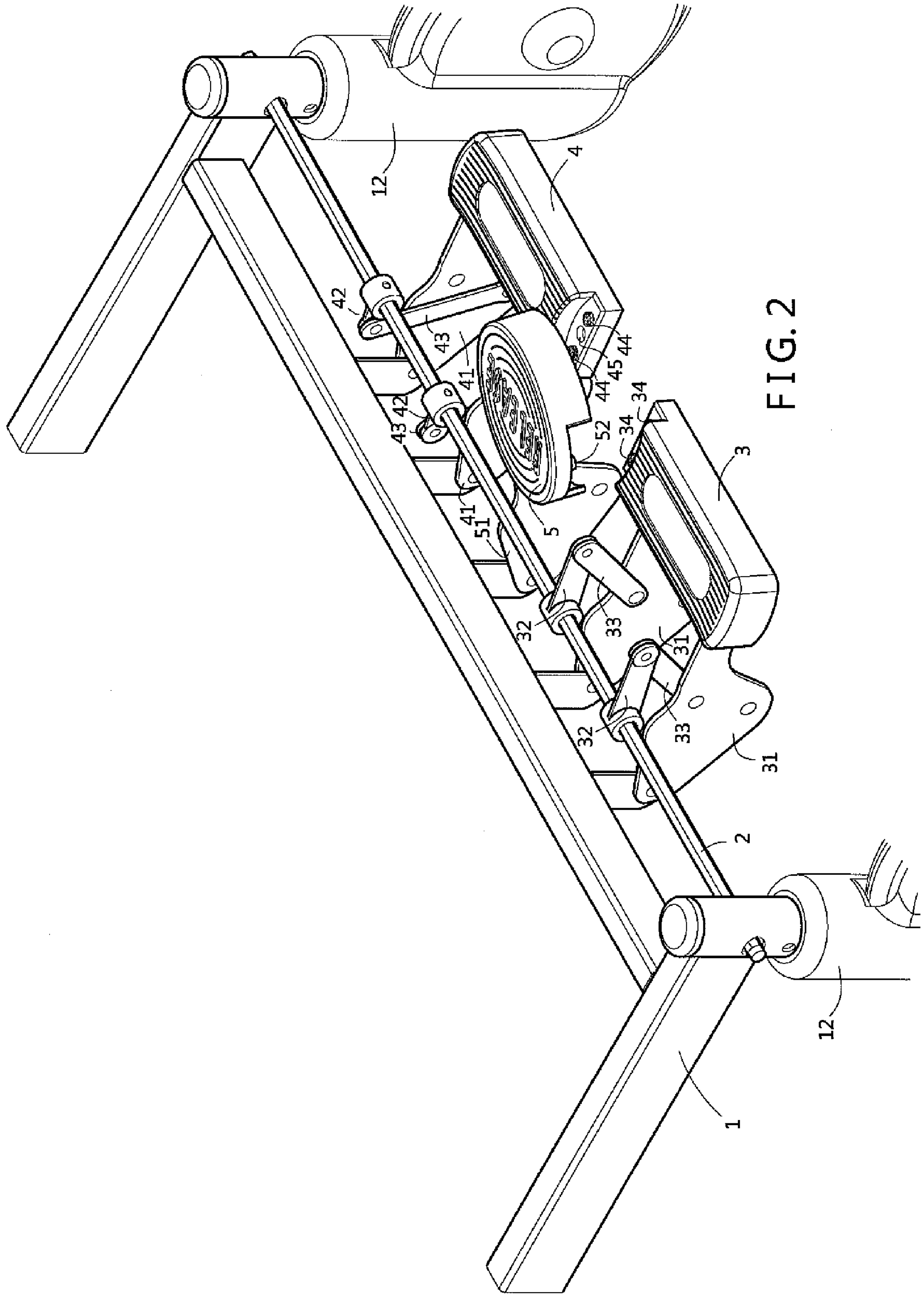
FIG. 2 is a schematic view showing the middle pedal being pulled upwardly according to the preferred embodiment of the present invention.
Figure 3:
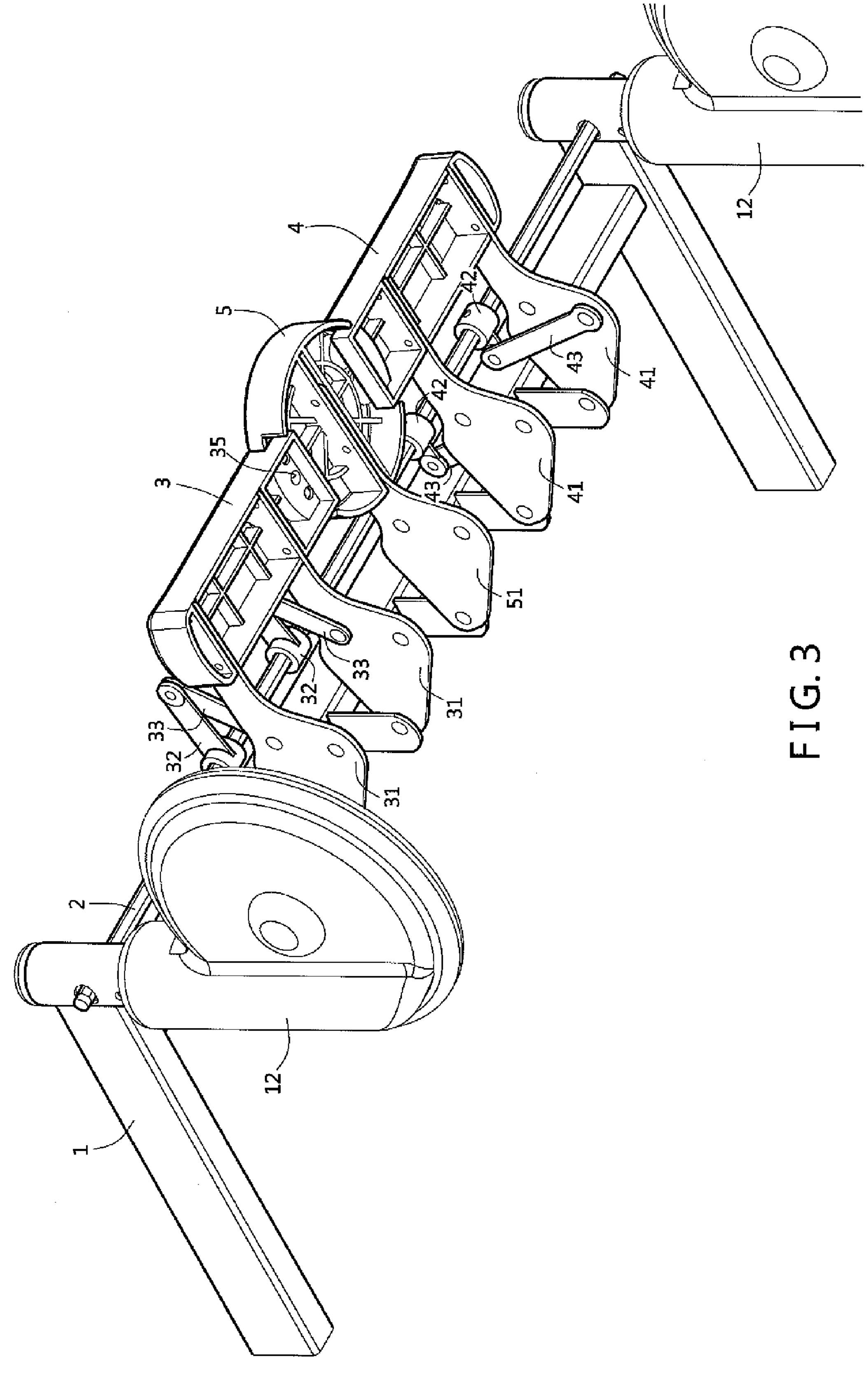
FIG. 3 is a rear perspective view showing the preferred embodiment of the present invention.

Please refer to FIG. 1, FIG. 2 and FIG. 3. The hospital bed is provided with a plurality of wheel modules 12. An axial shaft 2 passes through wheel modules 12 on two sides. The axial shaft 2 turns different directions to control the braking or orientation of the wheel modifies 12. The two axial shafts 2 at the front and rear ends of the chassis can turn simultaneously by a coupler (not shown in the figure). A plurality of swing racks 31, 41 and 51 are pivotally connected at predetermined locations on the chassis 1, and three pedals 3, 4 and 5 are pivotally fixed thereto. Driving components 32 and 42 pass through the axial shaft 2 corresponding to the swing racks 31 and 41 of the pedals 3 and 4 on two sides. The driving components 32 and 42 are in opposite directions, that is, the driving component 42 is towards the inside of the hospital bed while the driving component 32 is towards the outside of the hospital bed. Couplers 33 and 43 are pivotally connected between driving components 32 and 42 and the corresponding swing racks 31 and 41. In addition, the lower faces on two sides of the middle pedal 5 lean against the upper faces of the inside of pedals 3 and 4 on two sides. Cushions 34, 44 and guiding holes 35,45 are inserted on the faces of pedals 3 and 4 where the pedal 5 leans on. Protruding post 52 is disposed on the lower face of the pedal 5 corresponding to the guiding holes 35 and 45.

Figure 4:
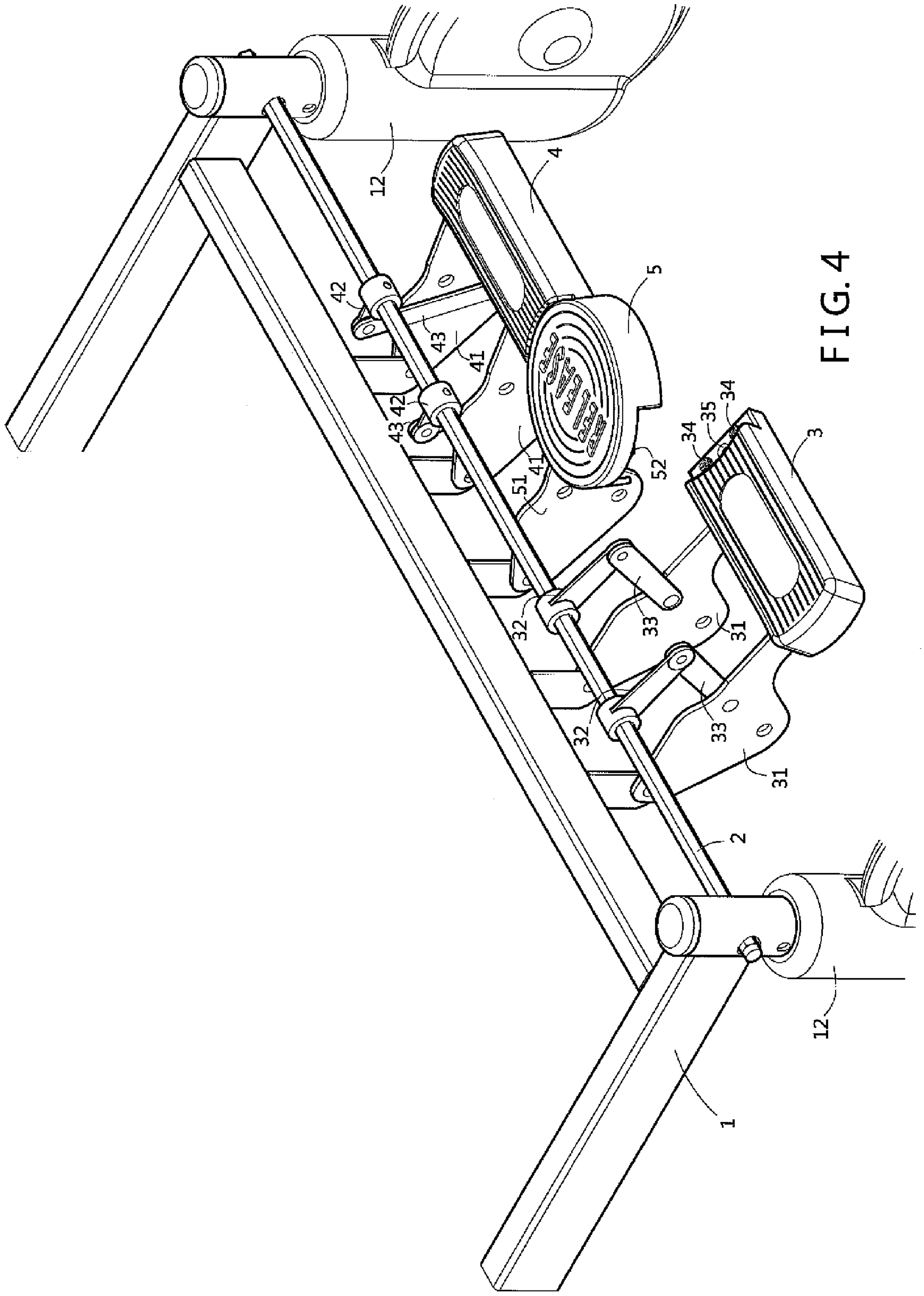
FIG. 4 is a schematic view showing one pedal at one side being stepped on downwardly in the preferred embodiment of the present invention.
Figure 5:
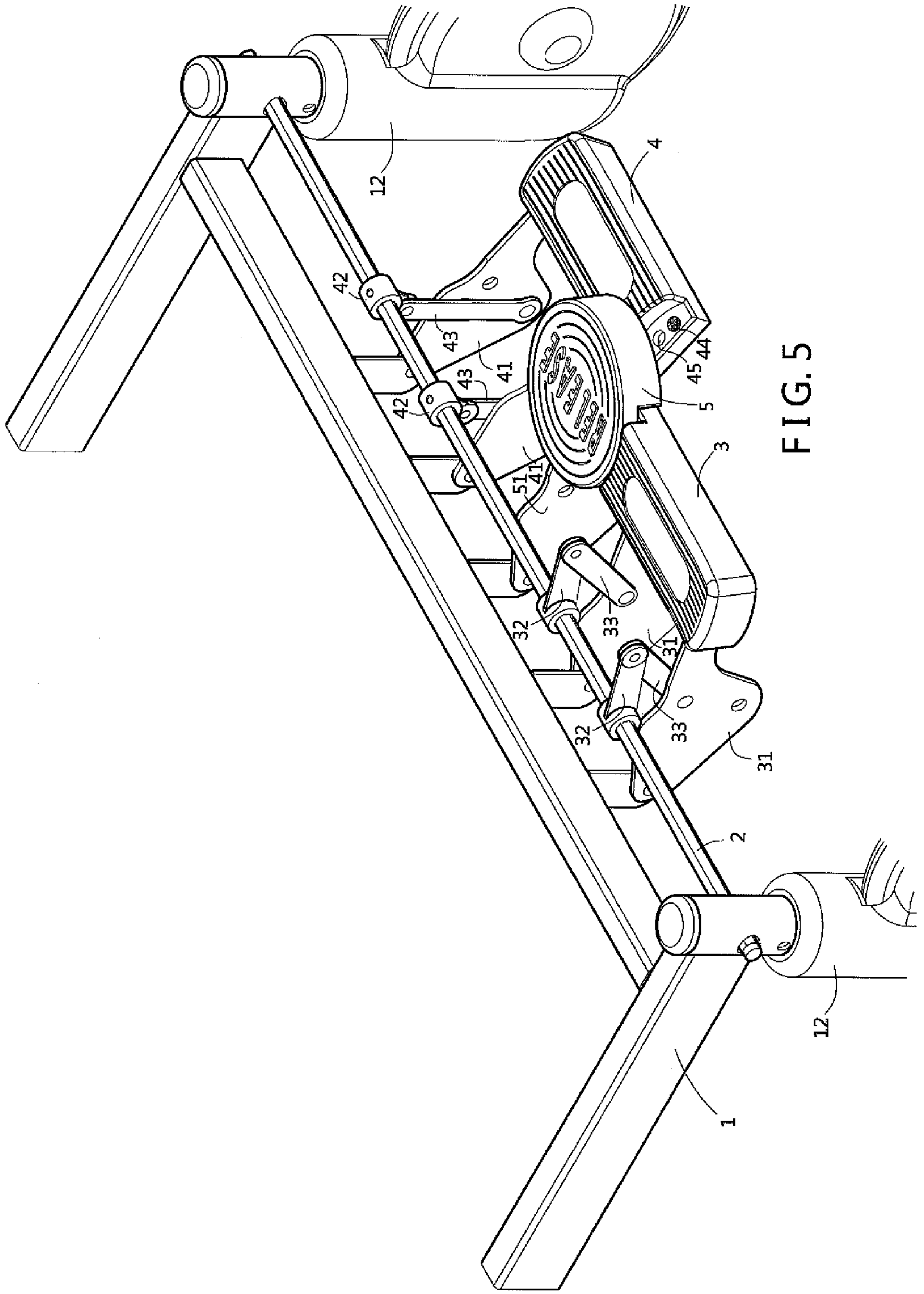
FIG. 5 is a schematic view showing the other pedal at the other side being stepped on downwardly in the preferred embodiment of the present invention.

As shown in FIG. 4 and FIG. 5, when any one of the pedals 3 and 4 on the left and right sides is stepped upon downwardly, the axial shaft 2 is driven to turn clockwise or anti-clockwise by the coupler 33 or 43 and the driving component 32 or 42 so that the wheel modules 12 on two sides of the axial shaft 2 are in a orientated state or a braking status, and the pedal 4 or 3 on the corresponding side drives the middle pedal 5 to swing upwardly slightly. If the oriented or braking status is to be returned to its original free status, the middle pedal 5 is stepped on downwardly, and the pedal 4 or 3 leaning thereon swings downwardly together and drives the pedal 3 or 4 on the corresponding side to swing upwardly until the pedals 3, 4 and the middle pedal 5 gather together. Because the pedals 3 and 4 on the left and right sides move in opposite directions and one of them leans on the other, the user cannot make pedal 3 or 4 to swing downwardly by stepping thereon, and the hospital bed shall return to a movable status.

From the operation mentioned above, it is obvious that the braking or orientation operation of the hospital bed is done by stepping on pedal 3 or 4, and therefore the operation is simplified and conforms to operating habits. In addition, if the oriented or braking status is to be disabled, only the middle pedal 5 is stepped on, which makes the operation more simple and convenient. A user cannot accidentally step on the pedal and cause wrong operation, which ensures stability and safety of operation.

Additionally, even if there is no middle pedal 5, if the oriented or braking status of the hospital bed is to be disabled, the pedal on the corresponding side can be stepped on slightly to make the pedal that is already stepped downwardly to swing upwardly and return to its original position, and the orientation or braking function of the wheel modules 12 is disabled.

What is claimed is:

1. A motion control apparatus of a hospital bed, comprising: two wheel modules; an axial shaft passing through the two wheel modules to control the braking or orientation of the two wheel modules; first and second swing pedals capable of swinging upwardly and downwardly and being pivotally disposed on one side of a chassis with the axial shaft; first and second driving components fixedly disposed on the axial shaft corresponding to the first and second swing pedals, with the first and second driving components driving the axial shaft in opposite directions; and first and second couplers connected between the first and second driving components and the corresponding first and second swing pedals.

2. The motion control apparatus of a hospital bed as claimed in claim 1, wherein a middle pedal capable of swinging upwardly and downwardly is pivotally disposed on the chassis between the first and second swing pedals, and lower faces of the middle pedal lean against upper faces of the first and second swing pedals.

3. The motion control apparatus of a hospital bed as claimed in claim 2, wherein cushions are disposed on the upper faces of the first and second swing pedals.

4. The motion control apparatus of a hospital bed as claimed in claim 2, wherein guiding holes are disposed on the upper faces of the first and second swing pedals, and protruding posts are disposed on the lower faces of the middle pedal for passing through the guiding holes.

* * * * *